US009409615B2

(12) United States Patent
Seo et al.

(10) Patent No.: US 9,409,615 B2
(45) Date of Patent: Aug. 9, 2016

(54) MOTORCYCLE (71) Applicant: Kawasaki Jukogyo Kabushiki Kaisha, Kobe-shi, Hyogo (JP)

(72) Inventors: Jiwon Seo, Kobe (JP); Kaoru Kouchi, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/928,847

(22) Filed: Oct. 30, 2015

(65) Prior Publication Data

US 2016/0052581 A1  Feb. 25, 2016

Related U.S. Application Data (63) Continuation of application No. PCT/JP2014/060867, filed on Apr. 16, 2014.

(30) Foreign Application Priority Data

May 10, 2013 (JP) ................ 2013-100148
Jun. 14, 2013 (JP) ................ 2013-125296
Sep. 2, 2013 (JP) ................ 2013-180987

(51) Int. Cl.
B62J 9/00 (2006.01)
B62J 6/04 (2006.01)
B62J 1/28 (2006.01)
B62J 6/00 (2006.01)

(52) U.S. Cl.
CPC .. *B62J 9/001* (2013.01); *B62J 1/28* (2013.01); *B62J 6/005* (2013.01); *B62J 6/04* (2013.01); *B62J 9/00* (2013.01)

(58) Field of Classification Search
CPC ................ B62J 9/00; B62J 9/001; B62J 9/02
USPC ......................................... 224/413
See application file for complete search history.

(56) References Cited

U.S. PATENT DOCUMENTS

| 4,163,513 | A | | 8/1979 | Kramer | |
|---|---|---|---|---|---|
| D445,398 | S | * | 7/2001 | Hanagan | ............... D12/410 |
| D497,341 | S | * | 10/2004 | Hanagan | ............... D12/410 |
| 7,150,382 | B2 | * | 12/2006 | Zickefoose | ........... B62J 11/00 |
| | | | | | 224/423 |

(Continued)

FOREIGN PATENT DOCUMENTS

| JP | 03-003114 | 1/1991 |
|---|---|---|
| JP | 2008-285065 | 11/2008 |

(Continued)

OTHER PUBLICATIONS

International Search Report for PCT/JP2014/060867, filed Apr. 16, 2014.

(Continued)

*Primary Examiner* — Justin Larson (57) ABSTRACT

A motorcycle includes a detachable pannier. A rear surface of the pannier includes a first inclined surface extending downward from an upper end so as to be inclined rearward, and a second inclined surface extending downward from a lower end of the first inclined surface so as to be inclined rearward at an angle greater than the first inclined surface. A light distribution requirement that a tail lamp and a turn indicator can be seen from a rear side is met in a state where the pannier is mounted.

6 Claims, 6 Drawing Sheets

(56) References Cited

U.S. PATENT DOCUMENTS

| | | | |
|---|---|---|---|
| 8,648,701 B2 * | 2/2014 | Hojo | B60R 25/24 224/413 |
| 8,864,002 B2 | 10/2014 | Iida et al. | |
| D743,325 S * | 11/2015 | Seo | D12/410 |
| 2005/0217599 A1 * | 10/2005 | Varner | A01K 1/0281 119/496 |
| 2006/0163302 A1 | 7/2006 | Knoch et al. | |
| 2011/0073627 A1 | 3/2011 | Iida et al. | |
| 2011/0233247 A1 * | 9/2011 | Kanazawa | B62J 9/001 224/413 |
| 2015/0121482 A1 * | 4/2015 | Berman | H04L 63/0884 726/5 |
| 2016/0052586 A1 * | 2/2016 | Kunisada | F01N 13/1805 280/830 |
| 2016/0053659 A1 * | 2/2016 | Tsubone | F01N 13/08 181/228 |

FOREIGN PATENT DOCUMENTS

| | | |
|---|---|---|
| JP | 2010-047164 | 3/2010 |
| JP | 2010-234913 | 10/2010 |
| JP | 2013-075553 | 4/2013 |

OTHER PUBLICATIONS

International Preliminary Report on Patentability and Written Opinion of the International Searching Authority dated Nov. 10, 2015 with English Translation (mailing date Nov. 19, 2015) for International PCT Patent Application No. PCT/JP2014/060867, filed Apr. 16, 2014 (8 pages).

* cited by examiner

MOTORCYCLE

CROSS REFERENCE TO THE RELATED APPLICATION

This application is a continuation application, under 35 U.S.C §111(a) of international application No. PCT/JP2014/060867, filed Apr. 16, 2014, which claims priority to Japanese patent application No. 2013-100148, filed May 10, 2013, Japanese patent application No. 2013-125296, filed Jun. 14, 2013, and Japanese patent application No. 2013-180987, filed Sep. 2, 2013, the entire disclosures of which are herein incorporated by reference as a part of this application.

BACKGROUND OF THE INVENTION

1. Field of the Invention

The present invention relates to a motorcycle including a detachable pannier.

2. Description of Related Art

A motorcycle has been known in which a pannier for accommodating a baggage is mountable to a rear portion of the motorcycle (e.g., Patent Document 1). The positions and shapes of the front surface, the upper surface, and the lower surface of the pannier are determined by a leg of a passenger, a passenger's seat, and a muffler, respectively. Thus, in order to increase the storage capacity of the pannier, it is necessary to extend rearward the rear surface of the pannier.

RELATED DOCUMENT

Patent Document

[Patent Document 1] JP Laid-open Patent Publication No. 2010-234913

However, when the rear surface of the pannier is extended rearward, a tail lamp, a turn indicator, and the like (hereinafter, referred to as "rear portion lamps") are hidden behind the pannier when viewed from an outer lateral side, and as a result, the light distribution of the rear portion lamps may be insufficient. A motorcycle has been suggested in which, in order to ensure sufficient light distribution, rear portion lamps are supported by a motorcycle frame structure via a bracket extending rearward. In this case, however, when the pannier is dismounted, the bracket is exposed, whereby the appearance is poor.

SUMMARY OF THE INVENTION

In view of the above-described problem, an object of the present invention is to provide a motorcycle in which a pannier having a large storage capacity is included but sufficient light distribution of a rear portion lamp is ensured even in a state where the pannier is mounted thereto and in which appearance thereof is not impaired even in a state where the pannier is dismounted.

In order to achieve the above-described object, a motorcycle of the present invention includes detachable pannier. A rear surface of the pannier includes a first inclined surface extending downward from an upper end so as to be inclined rearward, and a second inclined surface extending downward from a lower end of the first inclined surface so as to be inclined rearward at an angle greater than the first inclined surface, and is formed in a V shape opened rearward in a side view by both of the first and second inclined surfaces, whereby a light distribution requirement that a tail lamp and a turn indicator can be seen from a rear side, is met in a state where the pannier is mounted. An angle $\alpha$ of the V shape formed by the first inclined surface and the second inclined surface is preferably set within the range of 130° to 170°. In addition, preferably, a first inclination angle $\beta 1$ of the first inclined surface relative to a vertical direction is set within the range of 10° to 30°, and a second inclination angle $\beta 2$ of the second inclined surface relative to the vertical direction is set within the range of 40° to 65°.

According to this configuration, since the rear surface of the pannier extends downward so as to be inclined rearward, it is possible to increase the storage capacity of the pannier. In addition, since the rear surface of the pannier is formed in a V shape opened rearward, by disposing a rear portion lamp at the opened portion in the side view, it is possible to ensure sufficient light distribution of the rear portion lamp without disposing the rear portion lamp rearward via a bracket, even in a state where the pannier is mounted. Furthermore, since it is not necessary to dispose the rear portion lamp rearward via a bracket, the appearance is not impaired even in a state where the pannier is dismounted. If the angle $\alpha$ is less than 130°, it is difficult to ensure waterproofness of the pannier. If the angle $\alpha$ exceeds 170°, it is difficult to meet the light distribution requirement. Moreover, when the first inclination angle $\beta 1$ is set within the range of 10° to 30° and the second inclination angle $\beta 2$ is set within the range of 40° to 65°, it is possible to easily ensure the angle $\alpha$ in the range of 130° to 170° while the appearance of the pannier is kept favorable.

In the present invention, preferably, the pannier is supported by a motorcycle frame structure via a grab rail to be held by a passenger, and at least a portion of an inner end, in a motorcycle widthwise direction, of the pannier is located inward of the grab rail. According to this configuration, since the portion of the inner end, in the motorcycle widthwise direction, of the pannier is located inward of the grab rail in the motorcycle widthwise direction, it is possible to increase the dimension, in the motorcycle widthwise direction, of the pannier, and therefore, the storage capacity of the pannier further increases.

An outer end, in the motorcycle widthwise direction, of the pannier is preferably located inward of an outer end, in the motorcycle widthwise direction, of a rear-view mirror. According to this configuration, it is possible to suppress the dimension of the motorcycle in the motorcycle widthwise direction while the portion of the inner end, in the motorcycle widthwise direction, of the pannier is located inward of the grab rail in the motorcycle widthwise direction and the storage capacity of the pannier is increased.

In the present invention, a reinforcement portion for preventing deformation is preferably provided at an inside of a base portion of the V shape in the pannier. If the rear surface of the pannier is formed in a V shape, when the pannier is closed, the base portion of the V shape easily deforms, and thus it is difficult to ensure waterproofness. However, according to this configuration, since the reinforcement portion is provided at the inside of the base portion of the V shape, the base portion is unlikely to deform, whereby waterproofness can be ensured.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, preferred embodiments of the present invention will be described with reference to the drawings. The terms "left side" and "right side" used in this specification are the left side and the right side relative to a driver maneuvering a vehicle to travel forwards.

Figure 1:
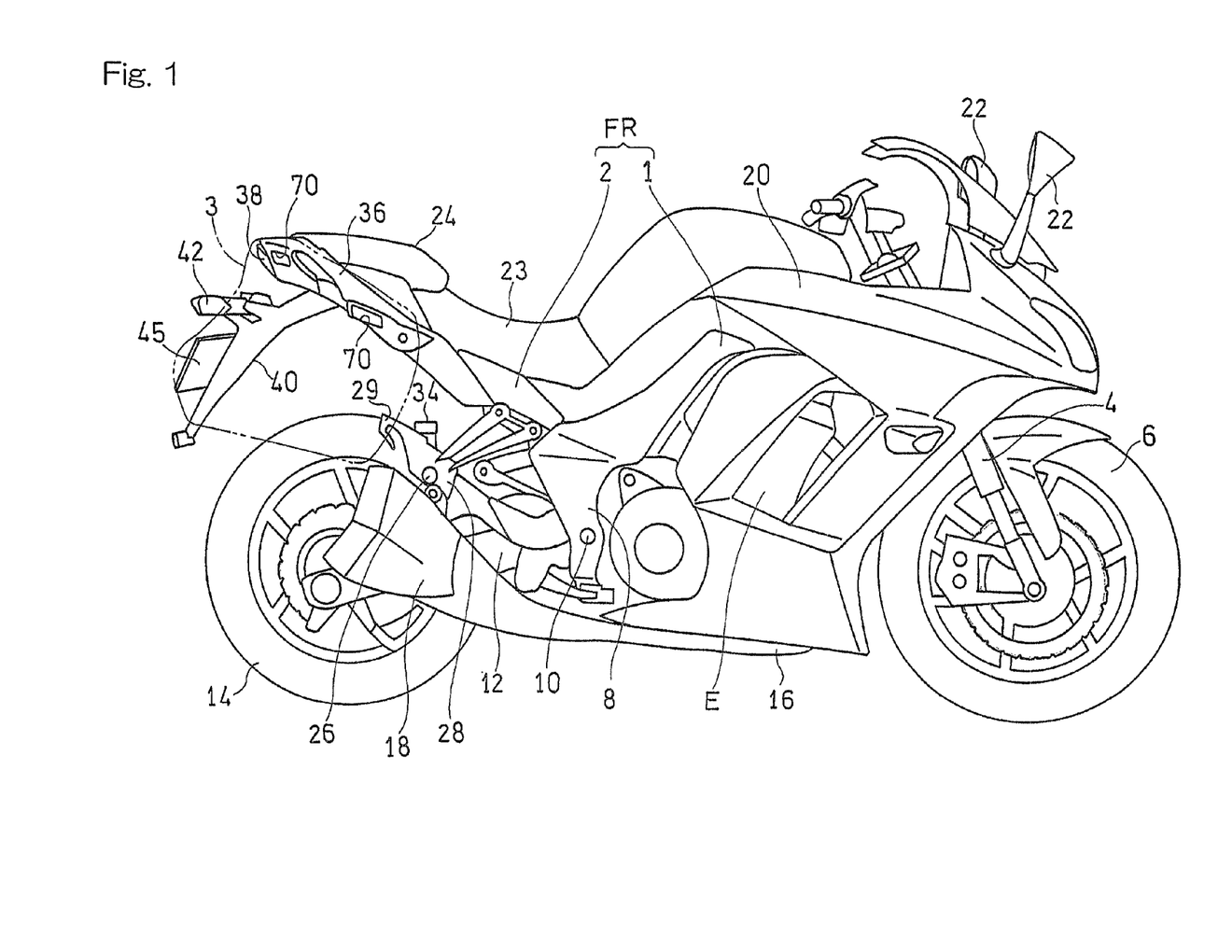
FIG. 1 is a side view showing a motorcycle according to a preferred embodiment of the present invention.

FIG. 1 is a side view of a motorcycle according to a preferred embodiment of the present invention. The motorcycle is a vehicle to and from which article storage panniers 3 are mountable and dismountable. FIG. 1 shows a state where the panniers are dismounted. A motorcycle frame structure FR for the motorcycle includes: a main frame 1 which forms a front half of the motorcycle frame structure FR; and a rear frame 2 which is connected to a rear portion of the main frame 1 and forms a rear half of the motorcycle frame structure FR. A front wheel 6 is supported by a front end portion of the main frame 1 via a front fork 4. A swingarm bracket 8 is provided at a lower portion of the rear end of the main frame 1. A swingarm 12 is supported by the swingarm bracket 8 via a pivot shaft 10 at a front end portion thereof so as to be able to swing in the vertical direction. A rear wheel 14 is supported by a rear end portion of the swingarm 12.

A combustion engine E is supported by a lower portion of the main frame 1, and the rear wheel 14 is driven by the engine E via a power transmission member 15 (FIG. 3) such as a chain. The engine E is, for example, a parallel multi-cylinder four-cycle engine. Exhaust gas of the engine E passes through an exhaust pipe 16 extending rearward via the front side and the lower side of the engine E, and is introduced into mufflers 18 connected thereto at both right and left sides of the rear wheel 14. Thereafter, exhaust gas is discharged from the mufflers 18 to the outside. A fairing 20 made of a resin is mounted to the main frame 1 to cover lateral sides of the engine E from front of the motorcycle frame structure FR. A rear-view mirror 22 is mounted to the fairing 20. The rear-view mirror 22 is provided at each of the right and left sides.

A rider's seat 23 and a passenger's seat 24 are supported by the rear frame 2. A step stay 28 configured to support a foot step 26 which is a footrest for a passenger is mounted to the rear frame 2, below the rider's seat 23, and above the muffler 18. The foot step 26 and the step stay 28 are provided at each of the right and left sides.

An engagement portion 29 is formed at the rear end of the step stay 28 so as to extend rearward. The pannier 3 is engaged with the engagement portion 29. By the step stay 28, various rear parts are supported in addition to the step 26 and the pannier 3. Specifically, a reservoir tank 34 for brake oil of a rear brake and the muffler 18 are supported by the step stay 28.

A grab rail 36 to be held by a passenger is mounted to the rear frame 2 and below the passenger's seat 24. The grab rail 36 is also provided at each of the right and left sides. A tail lamp 38 is mounted to a rear end portion of the rear frame 2. A rear flap 40 is mounted to the lower surface of a rear portion of the rear frame 2 so as to extend rearward and obliquely downward. A pair of right and left turn indicators 42 and a number plate 45 are mounted to the rear flap 40.

Figure 2:
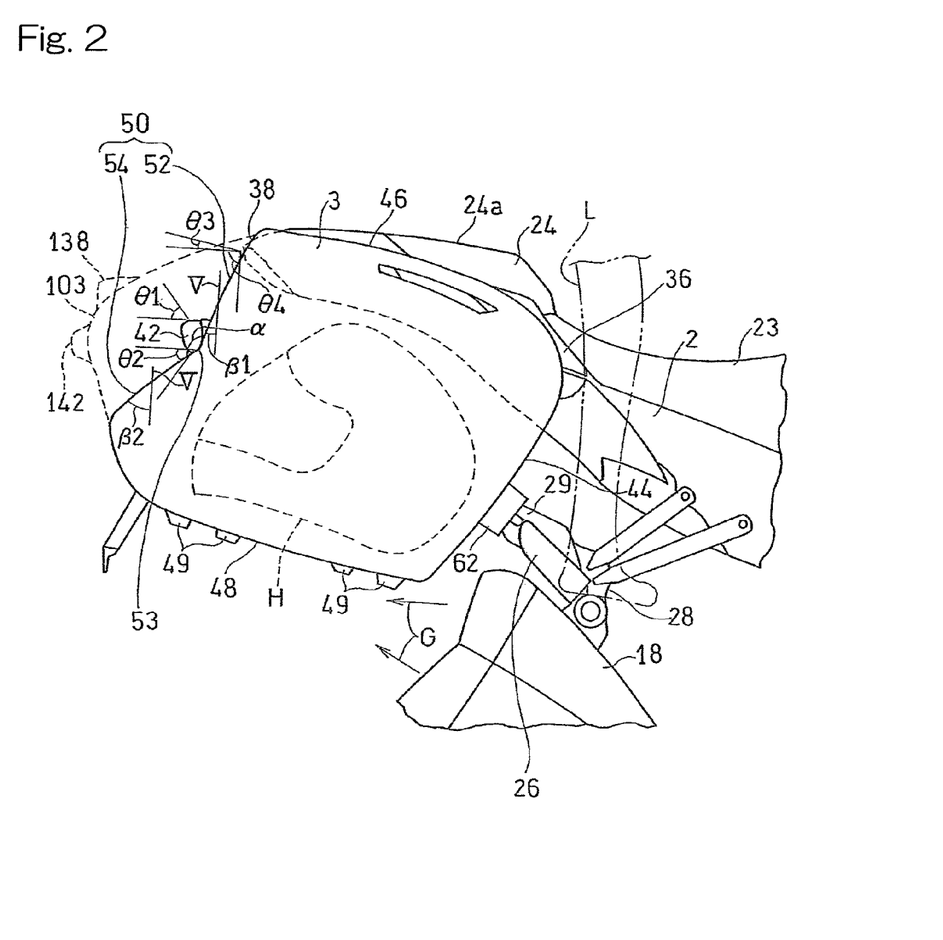
FIG. 2 is a side view showing a rear portion of the motorcycle in a state where a pannier is mounted thereto.

FIG. 2 is a side view showing a rear portion of the motorcycle in a state where the pannier 3 is mounted thereto. The pannier 3 is supported at a front portion thereof by the step stay 28 in a state where an upper portion thereof is supported by the rear frame 2 via the grab rail 36. A supporting structure for the pannier 3 will be described in detail later.

The pannier 3 of the present embodiment is made of ABS. Left and right side panniers 3, 3 are bilaterally symmetric with each other. However, the material of the pannier 3 is not limited thereto. The pannier 3 has a front surface 44 which is shaped along a leg L of the passenger. A to-be-engaged portion 62 is formed on the front surface 44 of the pannier 3 so as to project frontward, and the engagement portion 29 is engaged with the to-be-engaged portion 62. The pannier 3 has an upper surface 46 which is located below an upper surface 24*a* of the passenger's seat 24. The pannier 3 has a lower surface 48 that is located at a position at which exhaust gas G from the muffler 18 does not directly hit the lower surface 48. Hinges 49 are provided on the lower surface 48 of the pannier 3.

Figure 6:
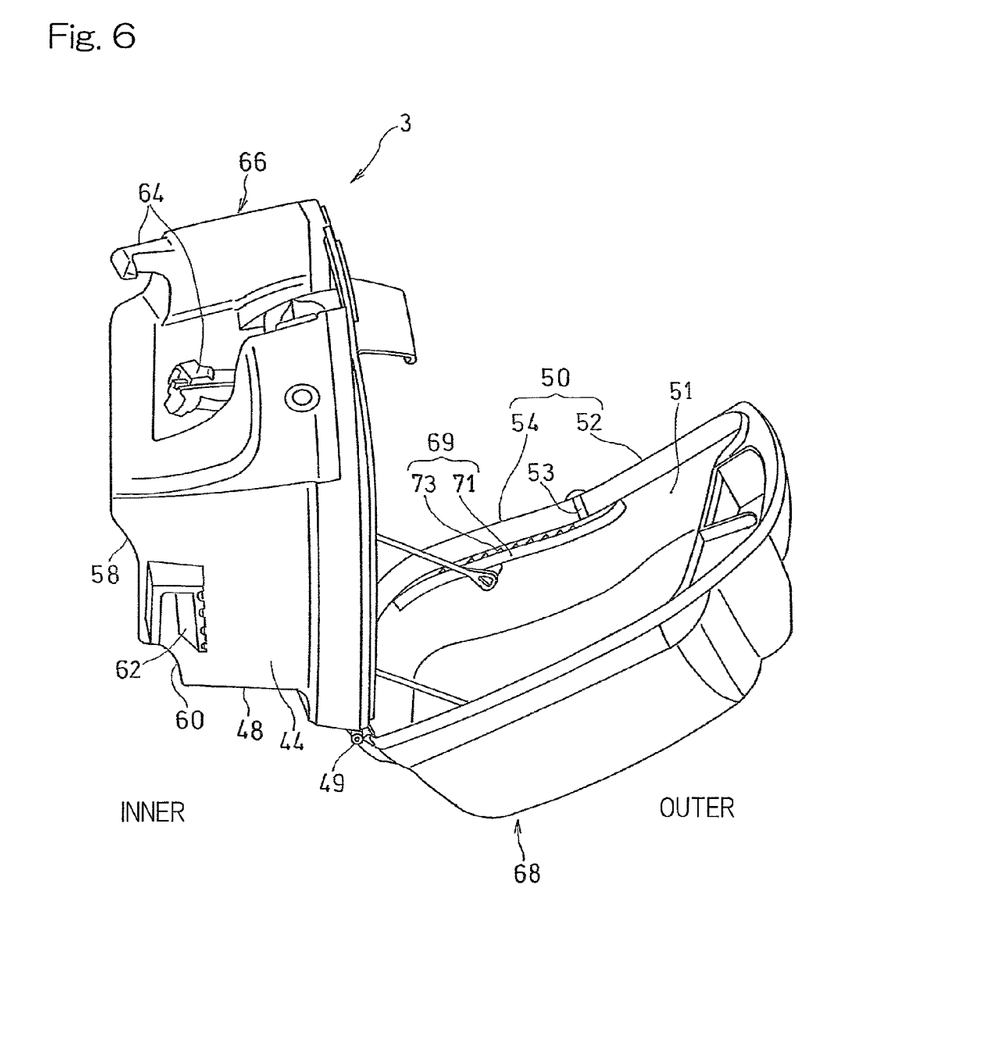
FIG. 6 is a perspective view showing a state where the pannier is opened.

That is, as shown in FIG. 6, the pannier 3 includes an inner side case 66 and an outer side case 68, and the inner and outer side case 66 and 68 open and close by means of the hinges 49 provided at a lower portion thereof. A packing (not shown) for waterproofing is provided at a contact portion between the inner side case 66 and the outer side case 68 over the entirety thereof.

The pannier 3 shown in FIG. 2 has a rear surface 50 which is located such that an upper portion thereof hides the tail lamp 38 at the rear end of the motorcycle frame structure (rear frame) 2 when viewed from an outer lateral side. The rear surface 50 includes a first inclined surface 52 extending downward from an upper end 50*a* thereof so as to be inclined rearward, and a second inclined surface 54 extending downward from a lower end 52*a* of the first inclined surface 52 so as to be further greatly inclined rearward, in a standard state where a rider rides and a passenger does not ride. That is, the rear surface 50 of the pannier 3 is formed in a V shape opened rearward in a side view.

In the present embodiment, the turn indicator 42 is exposed in a side view in a state where the pannier 3 is mounted to the motorcycle. A first inclination angle $\beta1$ of the first inclined surface 52 relative to a vertical direction V is preferably set within the range of 10° to 30° and more preferably 20° to 26° in a side view. A second inclination angle $\beta2$ of the second inclined surface 54 relative to the vertical direction V is preferably set within the range of 40° to 65° and more preferably 50° to 60° in a side view.

An angle $\alpha$ of the V shape formed by the first inclined surface 52 and the second inclined surface 54 is preferably set within the range of 130° to 170° and more preferably 140° to 160° in a side view. In the present embodiment, the angle $\alpha$ is about 150°. If the angle $\alpha$ is less than 130°, it is difficult to ensure waterproofness of the pannier 3 as described later. If the angle $\alpha$ exceeds 170°, it is difficult to meet light distribution requirements described later. When the first and second inclination angles $\beta1$ and $\beta2$ of the inclined surfaces 52 and 54 are set within the above ranges, it is possible to easily ensure the angle α while the appearance of the pannier 3 is kept favorable.

Figure 3:
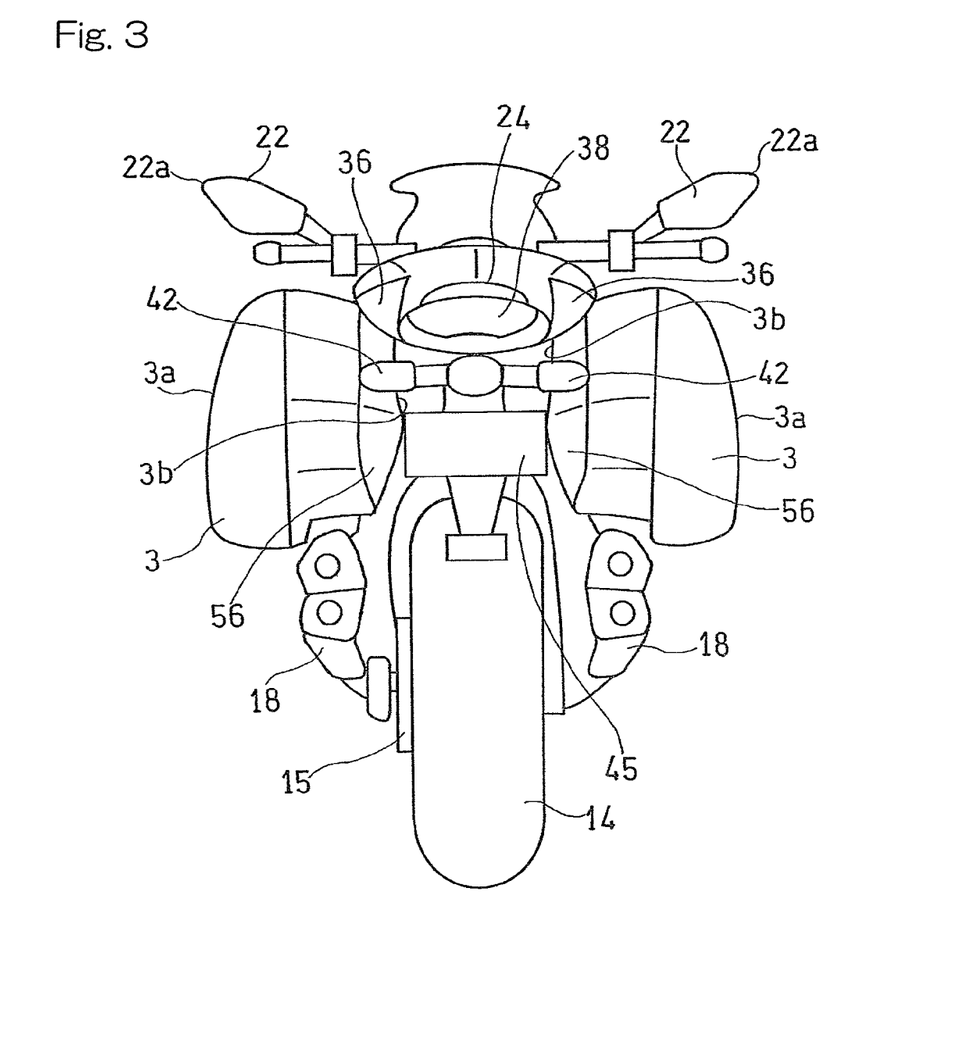
FIG. 3 is a rear view of the motorcycle.

FIG. 3 is a rear view of the motorcycle. As shown in FIG. 3, an outer end 3a, in a motorcycle widthwise, of each pannier 3 is located inward of an outer end 22a, in the motorcycle widthwise direction, of the rear-view mirror 22. Meanwhile, a portion of an inner end 3b, in the motorcycle widthwise direction, of each pannier 3 is located inward of the grab rail 36.

A lower portion of the inner end 3b, in the motorcycle widthwise direction, of each pannier 3 is provided with a first recess portion 56 recessed from the inner side surface of the pannier 3, in order to ensure a clearance for the number plate 45. In addition, on the lower surface 48 of each pannier 3, a second recess portion 58 (FIG. 5) is formed for avoiding interference with the rear wheel 14, and a third recess portion 60 (FIG. 5) is formed for avoiding interference with the chain 15 at the left side (FIG. 3).

Figure 4:
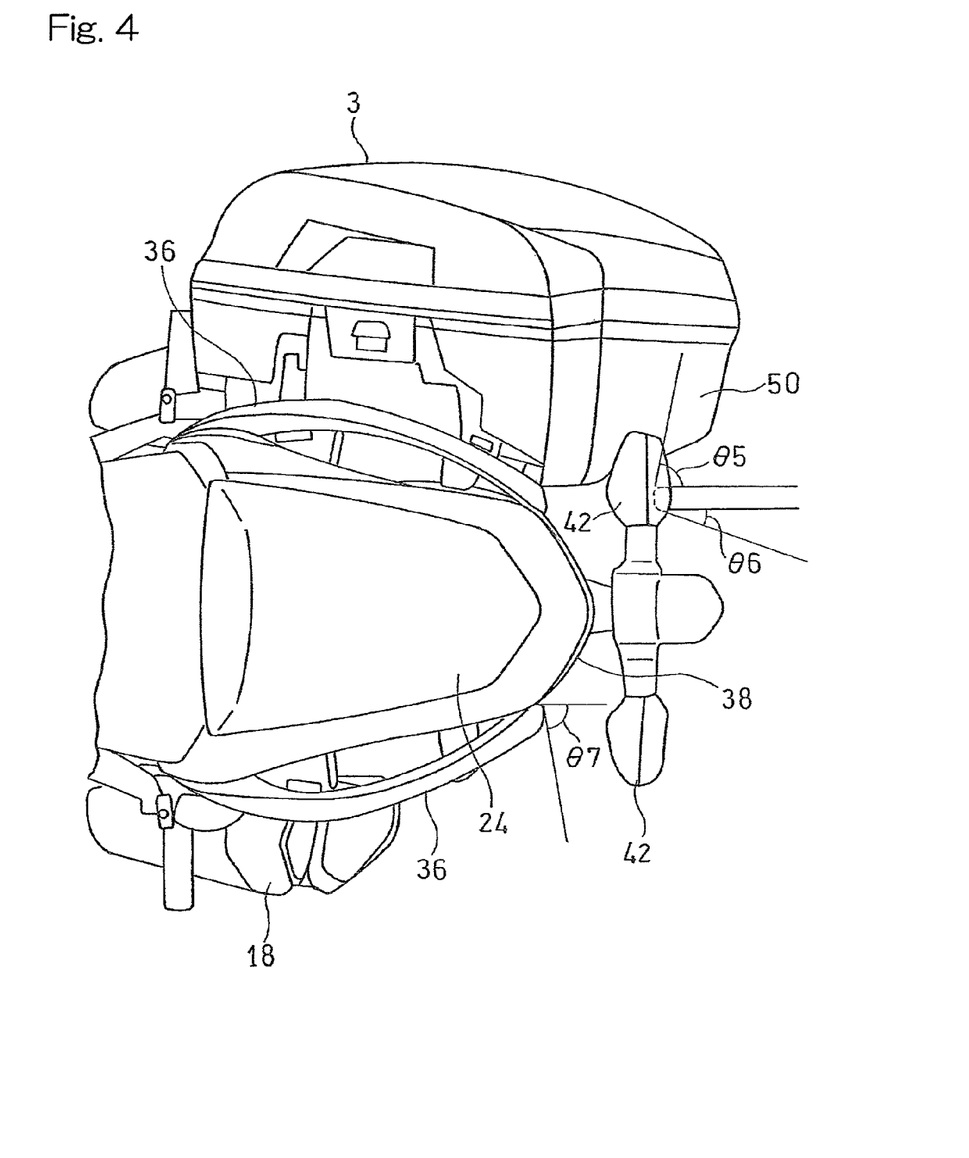
FIG. 4 is a plan view showing the rear portion of the motorcycle in a state where the pannier is mounted thereto.

As shown in FIG. 4, the rear surface 50 of the pannier 3 extends rearward so as to be inclined laterally outward in a plan view. In FIG. 4, only the pannier 3 at the right side is illustrated, and the pannier 3 at the left side is omitted.

Figure 5:
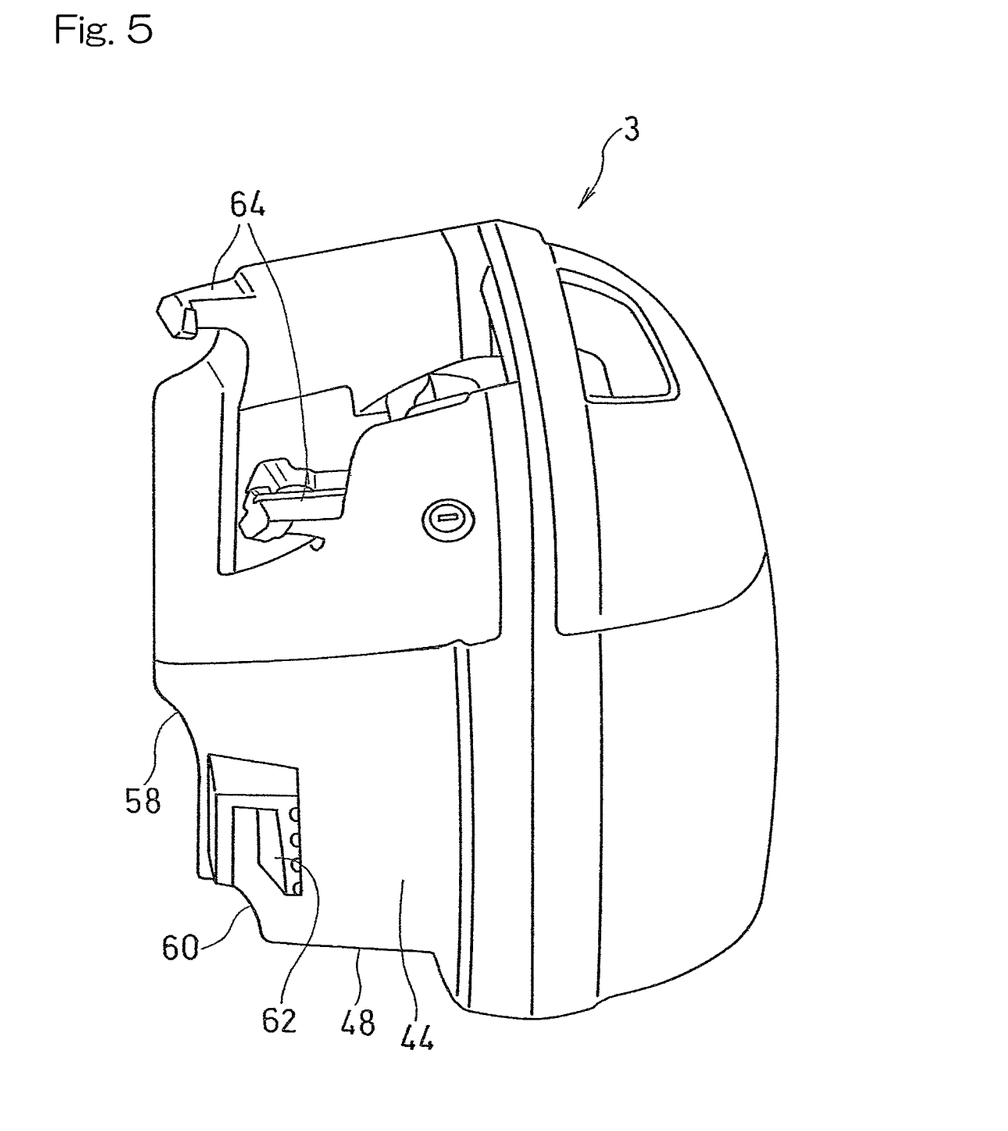
FIG. 5 is a front view of the pannier.

FIG. 5 is a front view of the pannier 3 at the left side as viewed from front of a motorcycle body. The to-be-engaged portion 62 on the front surface 44 of the pannier 3 is formed in a U shape opened downward. On the inner surface of an upper portion of the pannier 3, two projection portions 64 are formed so as to project to the inner side of the motorcycle body and be aligned in a front-rear direction or longitudinal direction of the motorcycle body.

The intersection angle α between the first inclined surface 52 and the second inclined surface 54 of the rear surface 50 of the pannier 3 shown in FIG. 2 is less than 180°. Thus, a base portion 53 of the V shape and a portion in the vicinity thereof easily deform when the pannier 3 is closed, whereby a seal member for waterproofing also deforms. Thus, it is difficult to ensure waterproofness. However, in the present embodiment, as shown in FIG. 6, a reinforcement portion 69 is provided on the inner surface of the outer side case 68 of the pannier 3 and in the vicinity of the base portion 53. Because of the reinforcement portion 69, the strength at and in the vicinity of the base portion 53 increases, and therefore, deformation does not occur and waterproofness can be ensured.

The reinforcement portion 69 includes an inner wall 71 formed at the inner side of the pannier 3 with respect to a rear wall 51 forming the rear surface 50, and a plurality of rib plates 73 connecting the rear wall 51 and the inner wall 71. The configuration of the reinforcement portion 69 is not limited thereto, and, for example, the reinforcement portion 69 may be configured by increasing the thickness of the rear wall 51.

Mounting the pannier 3 to the motorcycle frame structure FR will be described. The two projection portions 64 of the pannier 3 shown in FIG. 6 are inserted into engagement holes 70 of the grab rail 36 in FIG. 1 to be locked such that the projection portions 64 are prevented from coming out of the engagement holes 70. In this state, the engagement portion 29 of the step stay 28 is brought into engagement with the to-be-engaged portion 62 in FIG. 2. Thus, the pannier 3 is supported by the rear frame 2 via the grab rail 36 and the step stay 28.

A requirement for light distribution in the vertical direction of the tail lamp 38 and the turn indicator 42 is to be equal to or greater than 15° relative to the longitudinal (front-rear) axis of the motorcycle for the upper side and the lower side. In the present embodiment, in a state where the pannier 3 is mounted to the motorcycle body, an upper light distribution angle θ1 and a lower light distribution angle θ2 of the turn indicator 42 and an upper light distribution angle θ3 and a lower light distribution angle θ4 of the tail lamp 38 meet the requirement for light distribution.

A requirement for light distribution in the right-left direction or motorcycle widthwise direction of the tail lamp 38 in FIG. 4 is to be equal or greater than 80° relative to the longitudinal (front-rear) axis of the motorcycle for the right and left sides. A requirement for light distribution in the motorcycle widthwise direction of the turn indicator 42 is to be equal to or greater than 80° relative to the longitudinal axis of the motorcycle for the outer side, and be equal to or greater than 20° relative to the longitudinal axis of the motorcycle for the inner side. In the present embodiment, in a state where the pannier 3 is mounted to the motorcycle body, an outer light distribution angle θ5 and an inner light distribution angle θ6 of the turn indicator 42 and an outer light distribution angle θ7 of the tail lamp 38 meet the requirements for light distribution.

In the above-described configuration, as shown in FIG. 2, the rear end of the upper surface 46 of the pannier 3 extends to the rear end of the rear frame 2, and the rear surface 50 of the pannier 3 extends rearward so as to be inclined downward. Thus, it is possible to increase the storage capacity of the pannier 3. Specifically, each of the right and left panniers 3 is configured to have a size which allows an L-size helmet H to be stored therein.

The rear surface 50 of the pannier 3 is formed in a V shape opened rearward, and the turn indicator 42 is disposed at the opened portion in the side view. Thus, as shown in FIG. 4, even in a state where the pannier 3 is mounted to the motorcycle body, it is possible to ensure sufficient light distribution of the turn indicator 42 without disposing the turn indicator 42 rearward via a bracket.

The rear surface 50 of the pannier 3 shown in FIG. 4 extends rearward so as to be inclined laterally outward. Thus, even in a state where the pannier 3 is mounted to the motorcycle body, it is also possible to ensure sufficient light distribution of the tail lamp 38 without disposing the tail lamp 38 rearward via a bracket.

Only in order to increase the capacity of the pannier 3, as shown by a broken line 103 in FIG. 2, the pannier 103 may be greatly protruded rearward. However, if the pannier 103 is greatly protruded rearward, it is necessary to dispose each turn indicator 142 and the tail lamp 138 rearward at a position away from the rear frame 2 by using a bracket, as shown by broken lines 142 and 138 in FIG. 2, in order to ensure sufficient light distribution of the turn indicator 42 and the tail lamp 38. If each turn indicator 142 and the tail lamp 138 are disposed away from the rear frame 2 by using the bracket as described above, the appearance of the motorcycle is impaired when the pannier 3 is dismounted. If, in dismounting the pannier 3, the bracket is also detached, and then, each turn indicator 142 and the tail lamp 138 are attached to the rear frame 2 in order to prevent the appearance of the motorcycle from being impaired, the operations of mounting and dismounting the pannier 3 become complicated.

In the present embodiment, since it is not necessary to dispose each turn indicator 42 and the tail lamp 38 rearward via a bracket as described above, the appearance is not impaired even in a state where the pannier 3 is dismounted. In addition, in dismounting the pannier 3 from the motorcycle body, the pannier 3 does not hit a bracket, and it is not necessary to detach a bracket. Thus, it is easy to mount and dismount the pannier 3.

As shown in FIG. 3, each pannier 3 is mounted to the grab rail 36. Thus, a portion of the inner end 3b, in the motorcycle widthwise direction, of each pannier 3 is disposed inward of the rear frame 2 in the motorcycle widthwise direction, and therefore, it is possible to increase the capacity of the pannier 3. Meanwhile, the outer end 3a, in the motorcycle widthwise direction, of each pannier 3 is located inward of the outer end 22a, in the motorcycle widthwise direction, of the rear-view mirror 22. Thus, an increase in the overall dimension of the motorcycle in the motorcycle widthwise direction is suppressed. That is, it is possible to increase the capacity of each pannier 3 while suppressing an increase in the widthwise dimension of the motorcycle body.

Since the reinforcement portion 69 is provided at the inside of the base portion 53 of the V shape in the pannier 3, the base portion 53 is unlikely to deform. As a result, the seal member for waterproofing does not deform, and thus, it is possible to ensure waterproofness.

The first to third recess portions 56, 58, and 60 are formed in the pannier 3. Thus, it is possible to avoid interference between the number plate 45, the rear wheel 14, and the power transmission member 15.

The present invention is not limited to the above-described embodiment, and various additions, changes, or deletions can be made without departing from the gist of the present invention. For example, although each turn indicator 42 is exposed from each pannier 3 and the tail lamp 38 is covered by each pannier 3 from the outer lateral side in a side view in the above-described embodiment, it suffices that sufficient light distribution of each turn indicator 42 and the tail lamp 38 is ensured, and both each turn indicator 42 and the tail lamp 38 may be exposed, or may not be exposed. Therefore, these are construed as included within the scope of the present invention.

REFERENCE NUMERALS

3 . . . pannier
22 . . . rear-view mirror
36 . . . grab rail
38 . . . tail lamp (rear portion lamp)
42 . . . turn indicator (rear portion lamp)
50 . . . rear surface of pannier
52 . . . first inclined surface
53 . . . base portion of V shape
54 . . . second inclined surface
69 . . . reinforcement portion
FR . . . motorcycle frame structure

What is claimed is:

1. A motorcycle comprising a detachable pannier, wherein
a rear surface of the pannier includes a first inclined surface extending downward from an upper end so as to be inclined rearward, and a second inclined surface extending downward from a lower end of the first inclined surface so as to be inclined rearward at an angle greater than the first inclined surface, and is formed in a V shape opened rearward in a side view by both of the first and second inclined surfaces, whereby
a light distribution requirement that a tail lamp and a turn indicator can be seen from a rear side, is met in a state where the pannier is mounted.

2. The motorcycle as claimed in claim 1, wherein
the pannier is supported by a motorcycle frame structure via a grab rail to be held by a passenger, and
at least a portion of an inner end, in a motorcycle widthwise direction, of the pannier is located inward of the grab rail.

3. The motorcycle as claimed in claim 2, wherein an outer end, in the motorcycle widthwise direction, of the pannier is located inward of an outer end, in the motorcycle widthwise direction, of a rear-view mirror.

4. The motorcycle as claimed in claim 1, wherein a reinforcement portion for preventing deformation is provided at an inside of a base portion of the V shape in the pannier.

5. The motorcycle as claimed in claim 1, wherein an angle α of the V shape formed by the first inclined surface and the second inclined surface is set within the range of 130° to 170°.

6. The motorcycle as claimed in claim 5, wherein a first inclination angle $\beta 1$ of the first inclined surface relative to a vertical direction is set within the range of 10° to 30°, and a second inclination angle $\beta 2$ of the second inclined surface relative to the vertical direction is set within the range of 40° to 65°.

* * * * *